Sept. 19, 1950        B. M. MEDOF        2,522,794
DENTAL IMPLEMENT
Filed Feb. 8, 1950
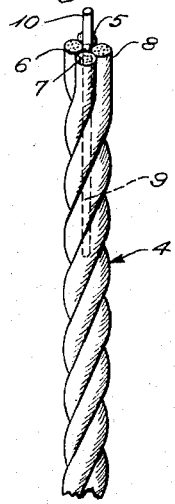
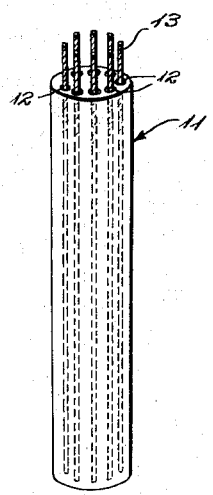
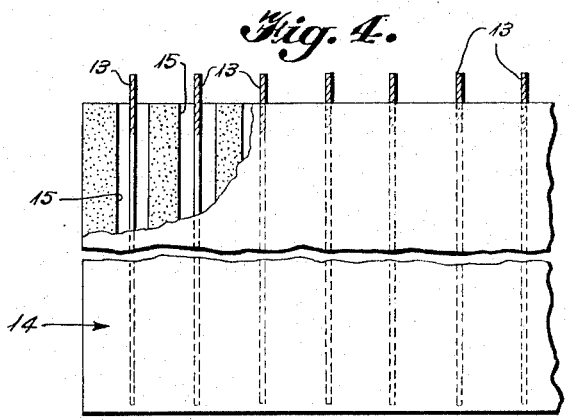
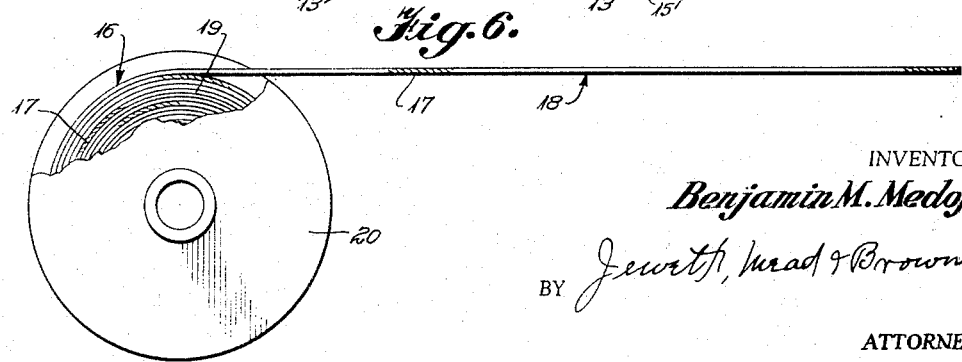
INVENTOR
Benjamin M. Medof
BY Jewett, Mead & Brown
ATTORNEYS Patented Sept. 19, 1950

2,522,794

UNITED STATES PATENT OFFICE 2,522,794

DENTAL IMPLEMENT

Benjamin M. Medof, Minneapolis, Minn.

Application February 8, 1950, Serial No. 142,969

6 Claims. (Cl. 132—93)

This invention relates generally to improvements in a dental implement, and is more particularly directed to an article of manufacture for cleaning between teeth.

It is an object of the present invention to provide an implement which may be more easily disposed between the teeth in the mouth than the conventional cleaning articles.

It is another object to provide dental floss with a stiffening element of such form as to serve as a leader for ease in insertion between the teeth in the mouth.

It is a further object to provide a dental implement particularly adapted for insertion under a fixed or stationary bridge, a location inaccessible to usual dental floss.

It is a further object of my invention to provide a simple and economical package for implements of the type described.

A still further object of the invention is to provide a reinforced dental floss in a formed adapted for efficient packaging and handling.

Other objects will be apparent from the following description and accompanying drawings:

In the drawings,

Fig. 1 is a side elevation of an illustrative embodiment of the invention;

Fig. 2 is a like view of an alternative form of the invention;

Fig. 3 shows one form of packaging the invention;

Fig. 4 is a side elevation of another form of packaging;

Fig. 5 is a top plan view of the structure of Fig. 4; and

Fig. 6 is a side elevation of a further alternative form of the invention packaged for ready handling.

The scale in Figs. 1 and 2 is much magnified.

In the embodiment of the invention shown in Fig. 1, dental floss 1 of conventional kind is provided with a stiffening element 2, with the end portion thereof 3 wrapped around the strand of dental floss 1 so as to present a needle-like structure.

According to my invention the over-all diameter of that portion of the implement shown in Fig. 1, which includes the strand of floss 1 and stiffening element 2 should be not materially greater than the diameter of the non-reinforced portion of the strand. In its preferred form the stiffening element 2 is made of fine wire substantially less in diameter than the strand of floss.

In an alternative form of my invention, Fig. 2, a length of dental floss 4 made up of a plurality of strands, represented in the drawing as 5, 6, 7, 8, has a stiffening insert 9, with a portion of said stiffening insert 10 extending beyond and enveloping the end portion of length 4 making one continuous diametric surface.

For packaging, a cylindrical casing 11, Fig. 3, is provided with a plurality of cavities 12 to accommodate article 13 made in accordance with my invention. A package made in the form described provides an efficient means for dispensing the implements of my invention.

Another form of package is shown in Fig. 4, wherein a sheet of plastic or similar material 14 is provided with a number of article accommodating bores 15.

A still further form of the present invention, combined with a means for packaging and providing a simple and effective dispenser therefor, is shown in Fig. 6. A roll of floss 16 is processed so as to provide periodically throughout its length reinforcing elements 17. In this form the strand 18, including the spaced element 17, is wound as a roll 19 on the spool 20. For use, a strand portion, including the reinforcing element, is severed or otherwise separated from the roll, making a simple and efficient combined package and dispenser.

My invention in the embodiments shown provides an implement for cleaning between teeth and more particularly as an aid in getting between and about one or more pontics (false or dummy teeth) in a fixed bridge. A reinforced needle-like portion is provided to serve as a leader permitting insertion thereof in the narrow space between such teeth, the strand of dental floss associated therewith then being available to perform its cleansing function when properly manipulated. Difficulty has been experienced by users of conventional dental floss in cleaning between and beneath the pontics of a permanent bridge, as the spaces between such teeth are not accessible in the usual manner, being obstructed by the bridge structure. The unhealthy situation occurring by virtue of the decay prompted by food particles which become lodged in these spaces can only be prevented by positive means. Such means are provided by the implement of my invention, allowing cleansing performance far superior to that afforded by tooth-picks and articles of similar nature, objectionable because of the possible injury to gum tissue and tooth-surfaces incurred through their use.

The space between normal teeth is wider at the gums or interproximal spaces than at the biting or chewing surfaces. The difficulty of inserting dental floss in the interproximal spaces is well known. The device of the present invention removes this difficulty.

While the stiffeners 3 and 9 are shown as projecting beyond the floss, such provision is not essential. Stiffeners may be made of other substances than wire, such as plastic or copper coping, etc.

In use the article may be merely inserted between the teeth or under a bridge and removed or reciprocated; or it may be inserted in the interproximal spaces and grasped on the lingual (tongue) side of the teeth and pulled through; or it may be inserted between the bridge bearing tooth and the pontic, the stiffener pulled through and the trailing floss may then be pulled up and over as far as desired to cleanse the pontic. It is possible also to distort the stiffener into a return bend, providing a hook insertable between the teeth or under a bridge from the lingual side without inserting the fingers into the mouth, and to grasp the protruding end for pulling the floss from within outward. Any described manipulation is possible with the initially straight implement shown.

Minor changes may be made in the physical embodiment of the invention within the scope of the appended claims without departing from the spirit of the invention.

I claim:
1. Teeth cleaning means comprising, in combination: dental floss having an exposed end; stiffening means embodied in said floss at and adjacent to said end for insertion into the interproximal spaces to guide said floss into said space for manipulation in a teeth cleaning operation.

2. The structure of claim 1 wherein said stiffened portion projects beyond the floss to a guide portion of reduced diameter.

3. A dental implement comprising a substantially continuous length of dental floss, stiffening means embodied in said floss at and adjacent to an exposed end thereof.

4. The implement of claim 3 wherein the stiffening means is a rigid body permanently associated with at least a portion of said continuous floss.

5. The implement of claim 4 wherein said rigid body is of less diameter than the floss and projects beyond an end thereof.

6. A package of dental cleaning material composed of a continuous strand of dental floss made up of severable lengths; and stiffening means embodied in said floss at least at one end of said lengths adjacent the points of severance.

BENJAMIN M. MEDOF.

No references cited.